July 9, 1946.  M. J. DI TORO  2,403,889
TELEMETERING SYSTEM
Filed Aug. 24, 1943
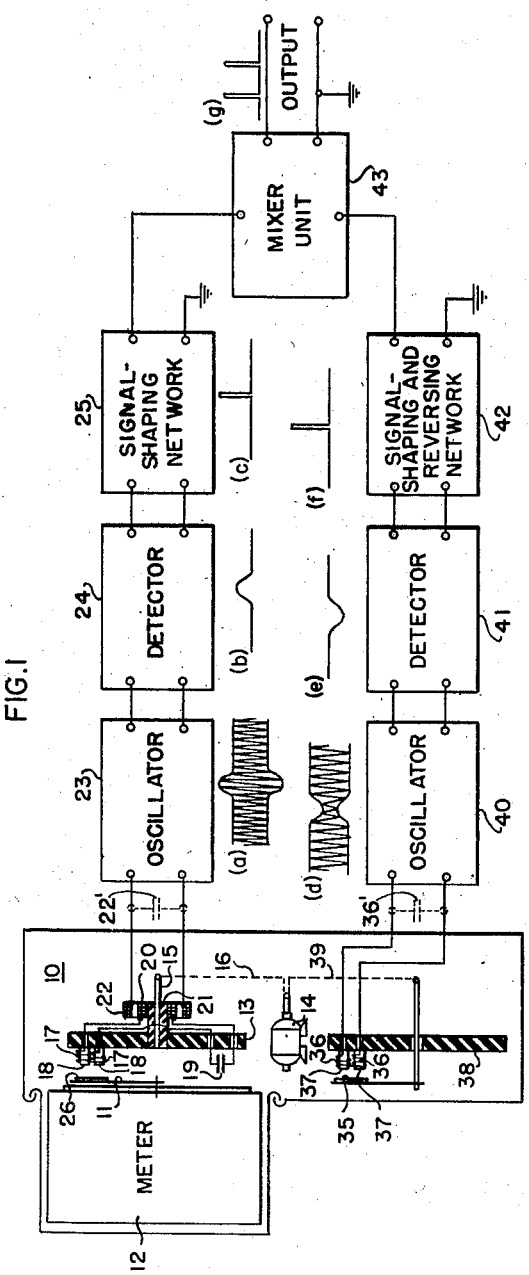
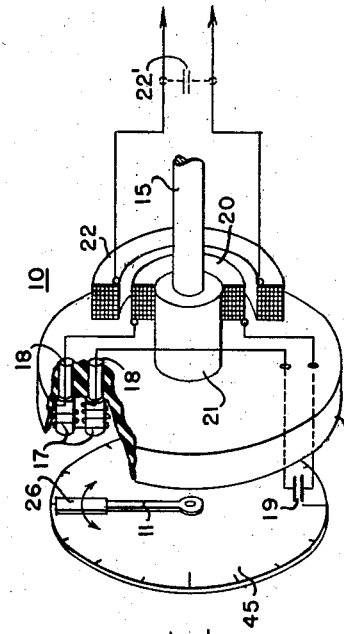
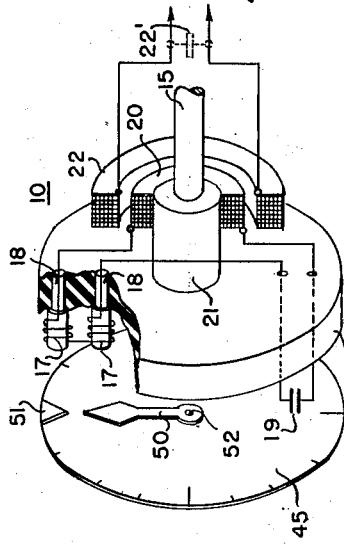
INVENTOR
MICHAEL J. Di TORO
BY *Harry S. Page*
ATTORNEY Patented July 9, 1946

2,403,889

UNITED STATES PATENT OFFICE 2,403,889

TELEMETERING SYSTEM

Michael J. Di Toro, Brooklyn, N. Y., assignor, by mesne assignments, to Hazeltine Research, Inc., Chicago, Ill., a corporation of Illinois Application August 24, 1943, Serial No. 499,769

10 Claims. (Cl. 177—351)

This invention relates to a telemetering system and, more particularly, to a system for scanning a meter or instrument to develop a signal representative of the information indicated thereon.

Telemetering systems of the prior art have employed several types of scanning to derive a signal representative of the information which is indicated on the dial of a meter. Apparatus of the television type including an electron beam scanning system has been used, but has been somewhat limited in application because of the considerable size and weight inherent in this type of equipment, particularly in connection with telemetering systems associated with aircraft. In addition, telemetering arrangements of this type, where the information is to be transmitted to the ground, require a transmission channel having a wide pass band. Alternative prior art systems, which employ scanning by means of a capacitance variation produced when the indicator of the instrument being telemetered alters its relative position, are not subject to some of the limitations of equipment of the television type but introduce other problems. Since the effective capacitance in such prior art systems is determined by the spacing of rather delicate movable members, vibration of the object carrying the telemetering equipment materially affects the performance of the equipment, which performance often depends upon critical spatial relationships. Spurious noises developed in such telemetering equipment by vibration greatly lessen the effectiveness of operation and the dependability of the indications derived from the equipment. Mechanical scanning devices which heretofore have been employed have been sluggish in their response and have not been uniformly responsive over the entire range of the instruments which were being telemetered.

It is an object of the invention, therefore, to provide a new and improved telemetering system which avoids one or more of the above-mentioned disadvantages of prior art arrangements.

It is another object of the invention to provide a telemetering system which develops a signal representative of the indications of a meter, which signal has a magnitude materially greater than that developed by spurious noises due to vibration or other causes.

It is a further object of the invention to provide a telemetering system for use in proximity to the meter scanned in which accuracy of alignment therewith is not critical for reliable performance.

It is an additional object of the invention to provide a telemetering system such that comparatively simple and inexpensive means can be used for conditioning a meter for use in conjunction with the telemetering apparatus.

In accordance with a feature of the present invention, a telemetering system for developing a signal representative of the position of a meter indicator, having at least a portion thereof formed of a material capable of having electrical losses produced therein, comprises oscillatory-field-producing means for producing the aforesaid electrical losses and having a value of impedance which varies with the proximity of the oscillatory field thereof to the material because of the electrical losses produced therein. The system includes means for effecting relative mechanical scanning motion between the oscillatory field of the field-producing means and the indicator, and means for supplying oscillations to the field-producing means to develop the oscillatory field and responsive to the variation of impedance of the field-producing means during the scanning motion for developing a signal which is representative of the position of the indicator.

For a better understanding of the present invention, together with other and further objects thereof, reference is had to the following description taken in connection with the accompanying drawing, and its scope will be pointed out in the appended claims.

In the accompanying drawing:

Fig. 1 is a diagrammatic representation of a telemetering system in accordance with the invention and includes associated electrical apparatus; Fig. 2 is a perspective view, with portions broken away, of a telemetering system embodying the invention; while Fig. 3 illustrates a modification of the arrangement of the present invention.

Referring now more particularly to Fig. 1 of the drawing, a telemetering system for developing a signal representative of the indication of a meter comprises a means 10 including an oscillatory field-producing means for scanning an indicator 11 of a meter 12 by movement of the last-mentioned means relative to the meter. The means 10 comprises a rotary support 13 which is positioned adjacent the indicator 11 and which is driven by a motor 14 coupled to a shaft 15, as indicated by the broken line 16. The axis of the rotor or support 13 is preferably normal to the face of the meter and coaxial with that of the meter indicator 11. Radially disposed oscillatory field-producing means 17, which preferably comprise a pair of coils of a material such as copper which has a relatively low product of high-frequency resistivity and high-frequency permeability, are mounted on the rotor 13 with the axes thereof substantially parallel to the rotor axis. These coils are connected in the same sense and, for best results, each encloses a magnetic core 18 of compressed comminuted iron particles, the latter being rigidly secured to the rotor in any suitable manner. The distance between the outer ends of the cores 18 and the indicator 11 is small, and preferably not greater than the diameter of a winding 17.

The oscillatory field-producing or winding means 17 is electrically connected to a condenser 19 and to a winding 20 which is disposed on an annular shoulder 21 on rotor 13 to form a series-resonant or tuned circuit. A stationary winding 22 is disposed adjacent winding 20 in a manner to provide a magnetic coupling between the scanning means including windings 17 and a means for supplying oscillations thereto comprising an oscillator 23. The windings 20 and 22 are coupled with optimum coupling and the oscillator 23 preferably is one which is capable of delivering a substantially constant current at a frequency which is high with respect to the frequency of scanning.

Across the leads to stationary winding 22 there exists an inherent capacitance represented by the dotted-line condenser 22' in Figs. 1 and 2. Winding 22 and capacitance 22' form a parallel-resonant circuit.

The telemetering arrangement also comprises a means coupled to the rotary scanning means 10 for deriving a signal in response to the influence of the indicator 11 at the position of the indicator on the meter 12. This means comprises a detector 24 of conventional design which is connected to the scanning means through the oscillator 23 and the stationary winding 22, and preferably includes a signal-shaping network 25 which comprises well-known signal-shaping devices, such as clippers, pulse sharpeners, and differentiating circuits for providing a sharp, narrow signal which denotes the exact center of the indicator 11 which is being scanned.

The indicators of airplane meters are generally made of aluminum. When such an indicator is used with a telemetering arrangement in accordance with the instant invention, best results are provided when the indicator has attached thereto a small strip 26 of material having a relatively large product of high-frequency resistivity and high-frequency permeability, such as the materials sold under the trade names of "Permalloy" and "Allegheny Mu-Metal," the latter having primary components of nickel, copper, chromium, and iron. This strip may have a thickness of about one or two mils and constitutes the only alteration to the meter which is required where optimum results are desired. In lieu of the above-described indicator, one made entirely of a metal having a relatively large product of high-frequency resistivity and high-frequency permeability may be employed. It has been found that high-permeability nickel alloys have proved particularly desirable when the oscillator 23 develops frequencies of the order of 150 kilocycles. The thickness of the strip 26 or the indicator 11 is preferably a minor fraction of the depth of penetration of the high-frequency oscillations. The resistivity of the indicator material, which preferably is high, should approach an optimum value for the particular value of permeability for the material which is selected. A useful treatment of the skin effect phenomenon, which includes the parameters of permeability and resistivity, is contained in an article by Harold A. Wheeler in the September 1942 issue of the Proceedings of The Institute of Radio Engineers at page 412.

Since the drawing is diagrammatic, it will be apparent that, in an actual telemetering system, the electrical scanning means 10 is secured in a convenient manner to the body of the meter with the windings 17, 17 within the region of influence of the indicator 11.

For the purpose of developing a signal including a component representative of the zero or reference point of the meter, the arrangement includes means comprising a rotatable indicator 35 for scanning a reference point. This means comprises a pair of windings 36, 36 disposed about powdered iron cores 37, 37 attached to a support 38. Across the leads to windings 36, 36 there exists an inherent capacitance represented by the dotted-line condenser 36'. Windings 36, 36 and capacitance 36' form a parallel-resonant circuit. The indicator 35, which is preferably similar to the above-described indicator 11, is driven by the motor 14 in a conventional manner, the driving connection being represented by the broken line 39, so that the rotary scanning means 10 and the indicator 35 have corresponding movement relative to the stationary elements. In a practical embodiment of the invention, these elements are driven at a speed of 50 revolutions per second. The windings 36 are connected in circuit with an oscillator 40, a detector 41, and a signal-shaping and reversing network 42, which are identical in character with the similar units previously mentioned with the exception of network 42 which, in addition to performing a signal-shaping function in the same manner as network 25, also reverses the polarity of its input signal for a purpose which will be explained below. The output circuits of both of the signal-shaping networks 25 and 42 are connected to a mixer unit 43 wherein the signal outputs are combined to provide a composite signal in response to the influence of the indicators at their respective positions on the meter and at the reference point. The primary components of this composite signal are preferably within the voice-frequency band so that it is suitable for transmission and reception by conventional transmitters and receivers.

The scanning arrangement shown in perspective in Fig. 2 is a more detailed illustration of that shown in Fig. 1, corresponding parts bearing the same reference numerals. The graduated dial 45 may be one which indicates a condition such as altitude, air speed, acceleration, or rate of climb of an airplane.

In operation of the telemetering system described, oscillations are supplied to the stationary winding 22 by oscillator 23 and are induced by winding 22 into the windings 17, 17 which comprise with condenser 19 and winding 20 a series-resonant circuit. The magnetic field produced by the winding 17, 17 set up eddy currents and hence produce electrical losses in the indicator element 26 when the windings 17, 17 are in proximity to the indicator 11. Since the indicator element 26 comprises a material having a relatively large product of its high-frequency resistivity and high-frequency permeability, it is capable of having substantial losses produced therein and the eddy currents so set up reflect an increased resistance into the circuit of windings 17, 17 in a manner that depends primarily upon the extent to which the indicator element 26 interferes with the normal flux paths. Accordingly, the series resistance reflected by the circuit of windings 17, 17 into the circuit of winding 22 is correspondingly decreased. It follows that the parallel-resonant impedance of the circuit comprising winding 22 and capacitance 22', as presented to oscillator 23, increases. This increase in impedance causes a corresponding increase in the amplitude of the generated oscillations, as illustrated by curve a of Fig. 1. Conversely, as windings 17, 17 recede from the indicator element 26, this sequence of events is reversed. It will be apparent to one skilled in the art that the arrangement may be modified to develop other than an amplitude-modulated signal, for example a frequency-modulated signal. The developed signal is translated to the detector 24 where it is demodulated to derive a pulse wave, as represented by curve b, and shaped in unit 25 to provide a narrow pulse, represented by curve c, which indicates the precise center of the indicator element 26, and thus the reading of meter 12.

It will be manifest that the synchronous rotations of indicator 35 past the windings 36 will periodically develop a similar signal in units 40–42, inclusive, which represents the zero or reference point of the meter being telemetered. Thus, oscillations are supplied to the windings 36, 36 by oscillator 40 and indicator 35, by reason of its movement in synchronism with that of rotary support 13, is periodically disposed in proximity to windings 36, 36. Under this condition, the parallel-resonant impedance of the circuit comprising windings 36, 36 and capacitance 36', as presented to oscillator 40, decreases. This decrease in impedance causes a decrease in the amplitude of the oscillations generated, as represented by curve d of Fig. 1. The output pulse signal of detector 41 is, therefore, of a polarity opposite to the output signal of detector 24, as represented by curve e. The polarity of the output signal of detector 41 is reversed by signal-shaping and reversing network 42 so that the resultant output signal of the signal-shaping and reversing network 42 is of the same polarity as the output signal of signal-shaping network 25, as represented by curve f.

The signals developed in the shaping networks 25 and 42 are combined in mixer 43 to provide a composite signal at the output terminals thereof, as represented by curve g, which is representative of the indication of the meter. A signal of the type shown by curve g is developed for each rotation of the rotor 13 and the indicator 35. This signal can be visually reproduced by any suitable apparatus, for example by an arrangement of the type shown in the copending application Serial No. 499,770, filed concurrently with this application, in the name of John Kelly Johnson, entitled Telemetering system, and assigned to the same assignee as the instant invention.

There is shown in Fig. 3 a portion of a modified telemetering arrangement which obviates the need for members 35–43, inclusive, of the Fig. 2 arrangement. The system includes a rotary means 10 for scanning a pair of indicators 50 and 51 of the meter, which are disposed at unequal radial distances from the axis 52, by movement relative to those indicators. Indicators 50 and 51 are preferably markers of material, such as that of element 26, and indicator 51 is preferably positioned at the zero or reference point on the dial 45. The windings 17, 17 and their cores 18, 18 are preferably spaced from the axis of rotation of rotor 13 by distances corresponding to the above-mentioned distances so that each winding is primarily responsive to an individual indicator. The arrangement of Fig. 3, when connected to oscillator 23, thus operates in a manner similar to that described above to produce both reference and indicator signals at the output circuit of unit 25.

From the foregoing description of the invention, it will be apparent that the oscillatory-field-producing means comprising windings 17 is effective to produce electrical losses in the strip 26 which forms a portion of the indicator 11 in Figs. 1 and 2, or losses in the indicators 50, 51 of the Fig. 3 arrangement. Also the oscillatory-field-producing means has a value of impedance which varies with the proximity of the oscillatory field thereof to the strip 26 or the indicators 50, 51 because of those losses. The motor 14 and rotary support 13 comprise means for effecting relative scanning motion between the oscillatory field of the field-producing means including windings 17 and the indicator 11, or indicators 50, 51, while the oscillator 23 comprises means for supplying oscillations to the field-producing means to develop the oscillatory field thereof and is responsive to the variation of impedance of the field-producing means during the scanning motion for developing a signal which is representative of the position of the indicator 11 or the relative positions of the indicators 50 and 51.

The use of an indicator comprising material having a relatively large product of high-frequency resistivity and high-frequency permeability, in conjunction with an instrument being telemetered, has several noteworthy features. The rotating scanning means 10 and its associated oscillator 23 are easily adjusted to provide a strong signal in the presence of an indicator of the character described. The arrangement will then be virtually insensitive to spurious signals arising from relatively large axial and planar misalignments of the rotor and the meter. The system, therefore, effectively compensates for ordinary misalignment. Vibration of the equipment and particularly the rotor 13 and the more delicate instrument indicator 11 will not affect the efficiency of the system and the accuracy of the results as in capacitive scanning arrangements. The system is, therefore, substantially nonmicrophonic. Furthermore, other elements on the dial face or on the instrument casing will not influence the fidelity of the derived indication since the telemetering system is primarily responsive only to materials of the type specified.

The loose magnetic coupling between the primary and secondary windings 20, 22 is likewise substantially unaffected by vibrations and additionally assists to provide a signal representative of a true indication, thereby enhancing the stability of performance. When, as in the Figs. 1 and 2 arrangements, the indicator 11 is provided with a strip 26 of material having a relatively high product of high-frequency resistivity and high-frequency permeability and the clearance between the cores 18 and the indicator 11 is approximately equal to the diameter of a winding 17, as previously mentioned, the windings 17 are relatively loosely coupled to the indicator. Under these conditions the instant telemetering system can be employed in conjunction with a conventional meter, which has the strip 26 applied to its indicator, without removing the usual glass window of the meter and yet provide a satisfactory sensitive indication of the position of the indicator. The glass window is then effective to shield the indicator from air currents which are developed by the movement of the rotor 13. Increasing the coupling between the windings 17 and the indicator 11 permits the use of material for the strip 26 which has a somewhat lower product of high-frequency resistivity and permeability.

In addition to deriving a signal denoting the center of the indicator, the signal-shaping networks 25 and 42 can provide a signal which is adapted for transmission by a channel having a pass band such as is employed in conventional radio transmitters and receivers.

It will be evident that the internal mechanism of the meter 12 comprises a means responsive to an effect to be measured, and that the indicator 11 comprises a means coupled to the first-mentioned means for indicating that effect. While the meter 12 has been described as one which preferably includes an indicator 11 including an element 26 comprised of a material having a relatively large product of high-frequency resistivity and high-frequency permeability, for some applications it will be unnecessary to provide an indicator of a material as specified above.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A telemetering system for developing a signal representative of the position of a meter indicator having at least a portion thereof formed of a material capable of having electrical losses produced therein comprising, oscillatory-field-producing means for producing said electrical losses and having a value of impedance which varies with the proximity of the oscillatory field thereof to said material because of said electrical losses therein, means for effecting relative mechanical scanning motion between said oscillatory field of said field-producing means and said portion of said indicator, and means for supplying oscillations to said field-producing means to develop said oscillatory field and responsive to the variation of impedance of said field-producing means during said scanning motion for developing a signal representative of the position of said indicator.

2. A telemetering system for developing a signal representative of the position of a meter indicator having at least a portion thereof formed of a material capable of having electrical losses produced therein comprising, oscillatory-field-producing means for producing said electrical losses and having a value of impedance which varies with the proximity of the oscillatory field thereof to said material because of said electrical losses therein, means for effecting relative mechanical scanning motion between said oscillatory field of said field-producing means and said indicator, and means for supplying oscillations to said field-producing means to develop said oscillatory field and responsive to the variation of impedance of said field-producing means during said scanning motion for developing a signal having components which may be utilized to indicate the position of said indicator.

3. A telemetering system for developing a signal representative of the position of a meter indicator having at least a portion thereof formed of a material capable of having electrical losses produced therein comprising, an oscillatory-field-producing winding for producing said electrical losses and having a value of impedance which varies with the proximity of the oscillatory field of said winding to said material because of said electrical losses therein, means for effecting relative mechanical scanning motion between said oscillatory field of said winding and said indicator, and means for supplying oscillations to said winding to develop said oscillatory field and responsive to the variation of impedance of said winding during said scanning motion for developing a signal representative of the position of said indicator.

4. A telemetering system for developing a signal representative of the position of a meter indicator having at least a portion thereof formed of a material capable of having electrical losses produced therein comprising, oscillatory-field-producing means including a tuned circuit for producing said electrical losses and having a value of impedance which varies with the proximity of the oscillatory field thereof to said material because of said electrical losses therein, means for effecting relative mechanical scanning motion between said oscillatory field of said field-producing means and said indicator, and means for supplying oscillations to said field-producing means to develop said oscillatory field and responsive to the variation of impedance of said field-producing means during said scanning motion for developing a signal representative of the position of said indicator.

5. A telemetering system for developing a signal representative of the position of a meter indicator having at least a portion thereof formed of a material capable of having electrical losses produced therein comprising, oscillatory-field-producing means for producing said electrical losses and having a value of impedance which varies with the proximity of the oscillatory field thereof to said material because of said electrical losses therein, means for supporting said last-mentioned means for rotatable movement about a circular path lying adjacent to said indicator to effect rotary mechanical scanning motion between said oscillatory field of said field-producing means and said indicator, and means for supplying oscillations to said field-producing means to develop said oscillatory field and responsive to the variation of impedance and said field-producing means during said scanning motion for developing a signal representative of the position of said indicator.

6. A telemetering system for developing a signal representative of the position of a meter indicator having at least a portion thereof formed of a material capable of having electrical losses produced therein comprising, oscillatory-field-producing means for producing said electrical losses and having a value of impedance which varies with the proximity of the oscillatory field thereof to said material because of said electrical losses therein, means for effecting relative mechanical scanning motion between said oscillatory field of said field-producing means and said indicator, and means magnetically coupled to said field-producing means for supplying oscillations thereto to develop said oscillatory field and responsive to the variation of impedance of said field-producing means during said scanning motion for developing a signal representative of the position of said indicator.

7. A telemetering system for developing a signal representative of the relative positions of a plurality of spaced meter indicators each of which is formed at least in part of a material capable of having electrical losses produced therein comprising, an oscillatory-field-producing winding for producing said electrical losses and having a value of impedance which varies with the proximity of the oscillatory field of said winding to said portion of each of said indicators because of said electrical losses therein, means for effecting relative mechanical scanning motion between said oscillatory field of said winding and said portions of said indicators, and means for supplying oscillations to said winding to develop said oscillatory field and responsive to the variations of impedance of said winding means during said scanning motion for developing a signal representative of the relative positions of said indicators.

8. A telemetering system for developing a signal representative of the position of a meter indicator having at least a portion thereof formed of a material characterized by a relatively large product of high-frequency resistivity and high-frequency permeability and thus capable of having substantial electrical losses therein comprising, an oscillatory-field-producing winding for producing said electrical losses and having a value of impedance which varies with the proximity of the oscillatory field of said winding to said material because of said electrical losses therein, said winding being formed of a material characterized by a relatively small product of high-frequency resistivity and high-frequency permeability, means for effecting relative mechanical scanning motion between said oscillatory field of said winding and said portion of said indicator, and means for supplying oscillations to said winding to develop said oscillatory field and responsive to the variation of impedance of said winding during said scanning motion for developing a signal representative of the position of said indicator.

9. A telemetering system for developing a signal representative of the position of a meter indicator comprising, a meter, an indicator for said meter having at least a portion thereof formed of a material characterized by a relatively large product of high-frequency resistivity and high-frequency permeability and thus capable of having substantial electrical losses therein, oscillatory-field-producing means for producing said electrical losses and having a value of impedance which varies with the proximity of the oscillatory field thereof to said material because of said electrical losses therein, means for effecting relative mechanical scanning motion between said oscillatory field of said field-producing means and said portion of said indicator, and means for supplying oscillations to said field-producing means to develop said oscillatory field and responsive to the variation of impedance of said field-producing means during said scanning motion for developing a signal representative of the position of said indicator.

10. A telemetering system for developing a composite signal representative of the relative positions of a meter indicator and a reference indicator each of which has at least a portion formed of a material capable of having electrical losses produced therein comprising, a first oscillatory-field-producing means for producing said electrical losses in said portion of said meter indicator and having a value of impedance which varies with the proximity of the oscillatory field thereof to said portion of said meter indicator because of said losses therein, a second oscillatory-field-producing means for producing said electrical losses in said portion of said reference indicator and having a value of impedance which varies with the proximity of the oscillatory field of said second field-producing means to said portion of said reference indicator because of said losses therein, means for effecting relative mechanical scanning motion between said oscillatory fields of said first and second field-producing means and said indicators, and means for supplying oscillations to said first and second field-producing means to develop said oscillatory fields and responsive to the variations of the impedances of said first and second field-producing means during said scanning motion for developing a composite signal representative of the relative positions of said indicators.

MICHAEL J. DI TORO.